Aug. 9, 1960 R. W. JENSEN ET AL 2,948,265
FLUID MOTOR
Filed Nov. 20, 1957 5 Sheets-Sheet 1
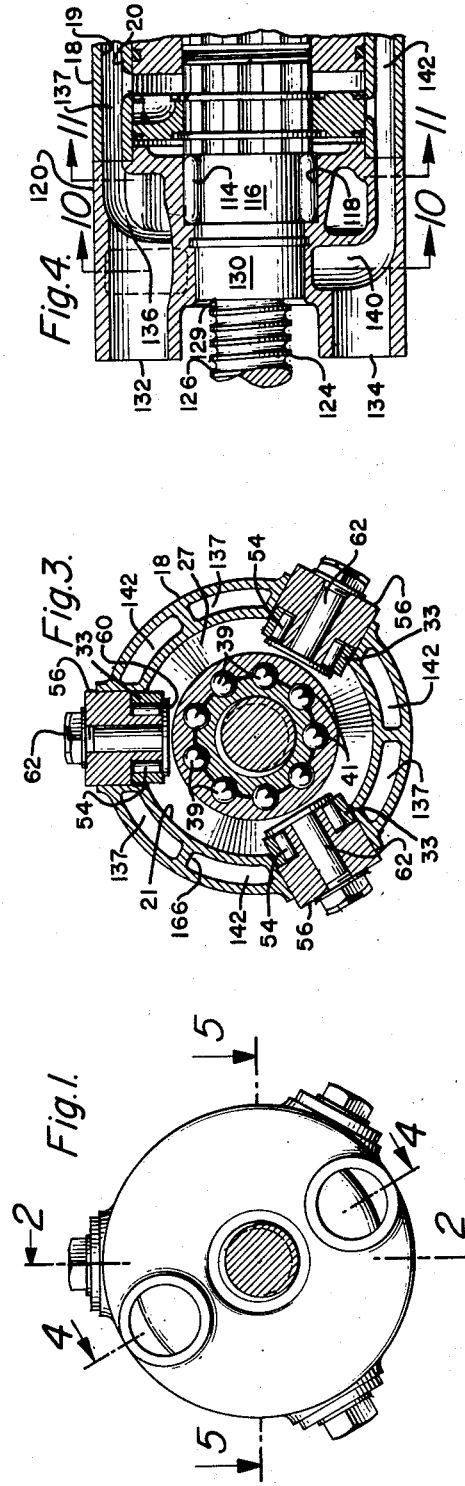
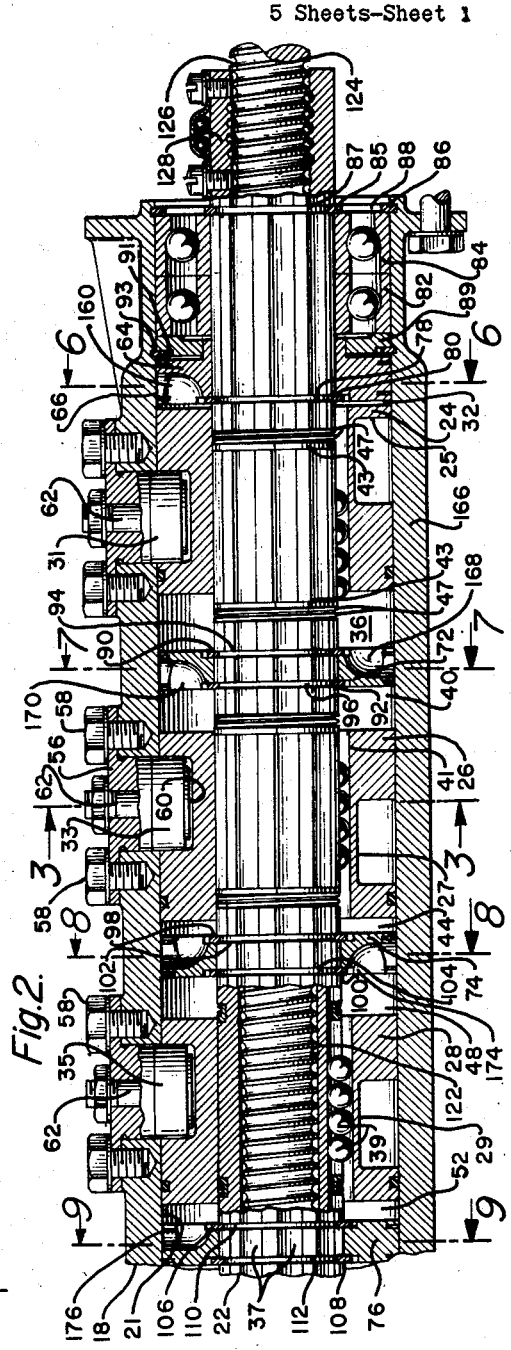
INVENTORS:
ROBERT M. BUSH,
RAYMOND W. JENSEN,
BY  LOUIS T. KING.
Herschel C. Omohundro
Attorney.

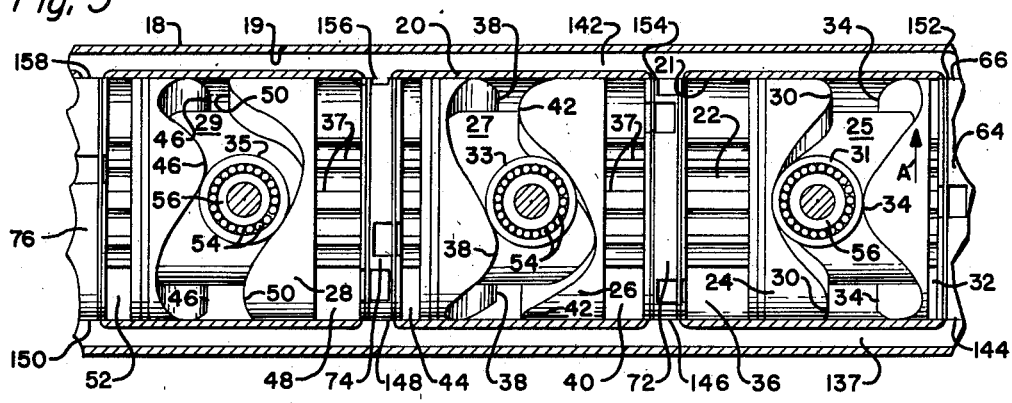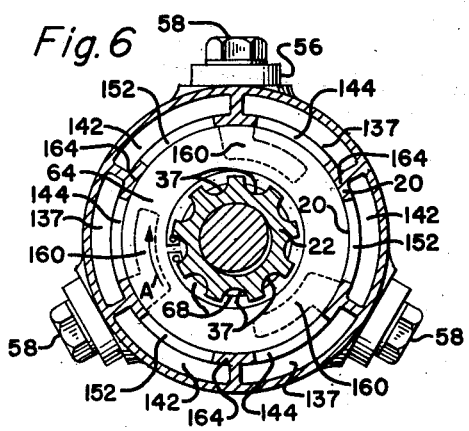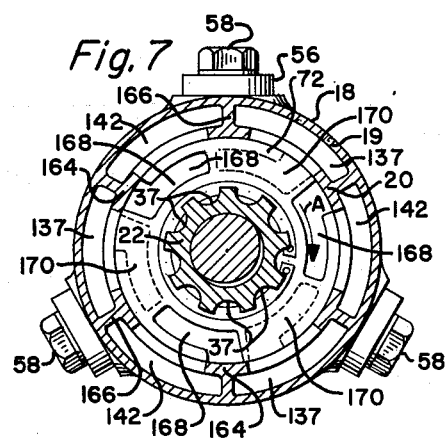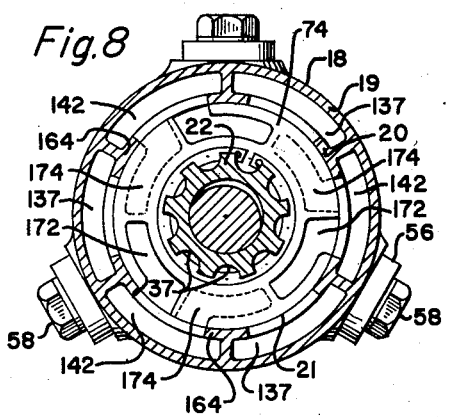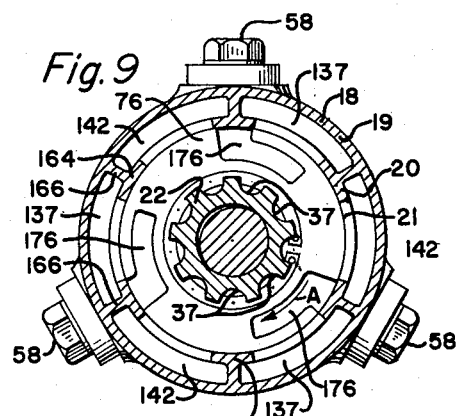

Aug. 9, 1960    R. W. JENSEN ET AL    2,948,265
FLUID MOTOR

Filed Nov. 20, 1957    5 Sheets-Sheet 3

INVENTORS:
ROBERT M. BUSH,
RAYMOND W. JENSEN,
BY   LOUIS T. KING.

Herschel C. Omohundro
Attorney.

Aug. 9, 1960 R. W. JENSEN ET AL 2,948,265
FLUID MOTOR
Filed Nov. 20, 1957 5 Sheets-Sheet 4

INVENTORS:
ROBERT M. BUSH,
RAYMOND W. JENSEN,
BY LOUIS T. KING.

Herschel C. Omohundro
Attorney.

Aug. 9, 1960  R. W. JENSEN ET AL  2,948,265
FLUID MOTOR

Filed Nov. 20, 1957  5 Sheets-Sheet 5

INVENTORS:
ROBERT M. BUSH,
RAYMOND W. JENSEN,
LOUIS T. KING.
BY
Herschel C. Omohundro
Attorney United States Patent Office 2,948,265
Patented Aug. 9, 1960

2,948,265

FLUID MOTOR

Raymond W. Jensen, Louis T. King, and Robert M. Bush, Phoenix, Ariz., assignors to The Garrett Corporation, Los Angeles, Calif., a corporation of California Filed Nov. 20, 1957, Ser. No. 697,608

14 Claims. (Cl. 121—39)

This invention relates generally to fluid motors capable of delivering high torque at low speed when operating under high temperature conditions without lubrication. More particularly, the invention relates to improvements in fluid motors of the type disclosed in the co-pending patent application of Bush et al., Serial No. 650,933, filed April 5, 1957, now Patent No. 2,896,590 dated July 28, 1959.

In high speed aircraft, many of the accessories must operate under high temperature conditions; for example, the exit nozzles of jet engines operate at high temperatures and require adjacent means for actuating them. Some aircraft operate at such high speeds that the inherently high temperature ram air causes heating throughout the structure and accessories thereof.

Hydraulic equipment, under high operating temperatures, is difficult to maintain, due to the fact that hydraulic fluid breaks down or vaporizes and creates a variety of undesirable conditions.

Electric motors also fail to operate at high temperatures due in part to deterioration of insulating materials therein and the inability of such motors to dissipate heat when operating under such conditions.

In high speed aircraft, wherein equipment must operate at high temperatures, pneumatically operated accessories have functional advantages, due to the fact that a pneumatic motive fluid is generally stable under high temperature conditions.

In aircraft, pneumatically operated accessories must be of a compact nature, and therefore, it is desirable that their over-all bulk be comparable to or less than that of conventional electrically or hydraulically operated actuators.

Accordingly, it is an object of the present invention to provide a fluid motor which will operate various accessories in an aircraft when under high temperature conditions.

Another object of the invention is to provide a compact, high-torque, low-speed, pneumatic motor which will operate under high temperature conditions and without lubrication.

Another object of the invention is to provide a pneumatic motor which is particularly designed to deliver high torque at low speeds, whereby the mechanism of the motor may deliver a desired amount of power and yet operate at high temperatures without lubrication between the operating parts thereof.

Another object of the invention is to provide a fluid motor having a novel combination of axially movable, cam-operated pistons disposed concentrically with and connected to a common shaft by spline means, which permits the pistons to rotate the shaft and at the same time reciprocate axially thereon.

Another object of the invention is to provide a pneumatic motor having axially movable, cam-actuated pistons mounted concentrically on a hollow shaft, which screw-threadedly actuates a jackscrew positioned internally thereof, whereby the present motor is maintained very compact in proportion to its utility.

Another object of the present invention is to provide a pneumatic motor having a hollow shaft which is open at both ends, whereby a jackscrew of any desired length may be projected therethrough and driven by a threaded nut secured to the shaft.

Another object of the invention is to provide a pneumatic motor having a hollow central shaft which actuates a jackscrew disposed internally thereof; said jackscrew and said shaft being operable to actuate throttling valves which limit flow through the motor when the jackscrew reaches predetermined extended or retracted positions, whereby the motor and jackscrew are automatically stopped when the jackscrew reaches either of said predetermined positions.

Another object of the invention is to provide a pneumatic motor housing having a piston-supporting cylinder bore wherein rotary valves revolve and conduct inlet and exhaust fluids to and from opposite ends of pistons reciprocally mounted in the bore, and wherein the rotary valves also act as partitions between fluid chambers receiving the pistons.

Another object of the invention is to provide a cam piston type pneumatic motor having pistons and rotary valves all mounted on a common shaft and all movable in a common bore externally of and concentric with the shaft, whereby an extremely simple, economical and compact construction is attained.

Another object of the present invention is to provide a pneumatic motor which is particularly adapted for installation adjacent to a jet engine, which attains a high temperature during use for operating an adjustable nozzle or thrust reverser device cooperating therewith.

A further object of the invention is to provide a positive displacement pneumatic motor having high stall torque, whereby a jackscrew actuator may be driven directly by the shaft of the motor without the use of complicated reduction gear mechanism.

A still further object of the present invention is to provide a powerful pneumatic motor of small diameter which has a hollow concentric shaft containing an axially extendible jackscrew, the construction of the motor and jackscrew being very compact.

Further objects and advantages of the invention may be apparent from the following specification, appended claims and accompanying drawings, in which:

Figure 1 is an end view of a fluid motor constructed in accordance with the present invention;

Fig. 2 is a fragmentary axial sectional view thereof taken on a plane indicated by the line 2—2 of Fig. 1;

Fig. 3 is a transverse sectional view of the motor taken on the plane indicated by the line 3—3 of Fig. 2;

Fig. 4 is a fragmentary axial sectional view of one end of the motor taken on the plane indicated by the line 4—4 of Fig. 1 and showing the inlet and exhaust passages of the motor;

Fig. 5 is a fragmentary horizontal sectional view of the motor taken on the plane indicated by the line 5—5 of Fig. 2 and showing the pistons and valves of the motor in elevation to facilitate the illustration;

Fig. 6 is a transverse sectional view of the motor taken on the plane indicated by the line 6—6 of Fig. 2 showing one of the rotary valves of the motor in elevation and illustrating in dotted lines the positions of the valve passages therein;

Fig. 7 is a view similar to Fig. 6 taken on the plane indicated by the line 7—7 of Fig. 2 showing another rotary valve of the motor in elevation, and showing the passages in this valve in positions corresponding to those of the passages in the valve illustrated in Fig. 6 of the drawings;

Fig. 8 is also a view similar to Fig. 6 taken on the plane indicated by the line 8—8 of Fig. 2 showing another rotary valve of the motor in elevation and its passages in positions corresponding to those of the passages of other valves illustrated in Figs. 6 and 7;

Fig. 9 is a transverse sectional view of the motor taken on the plane indicated by the line 9—9 of Fig. 2 showing another rotary valve of the motor in elevation and showing its valve passages in positions corresponding to those of the valves shown in Figs. 6, 7 and 8 of the drawings;

Figure 18:
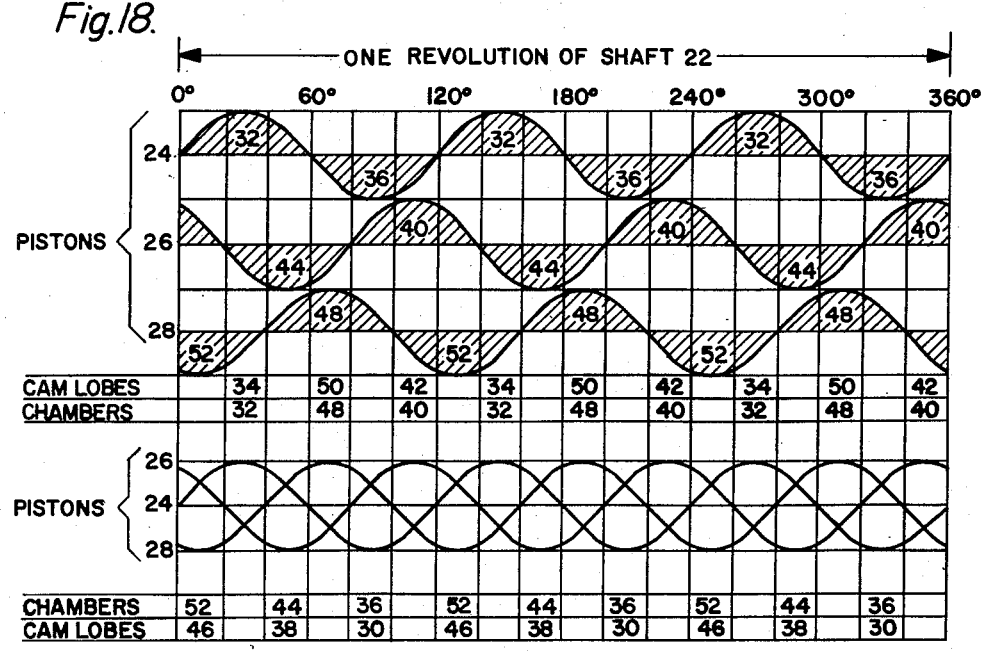
Figure 19:
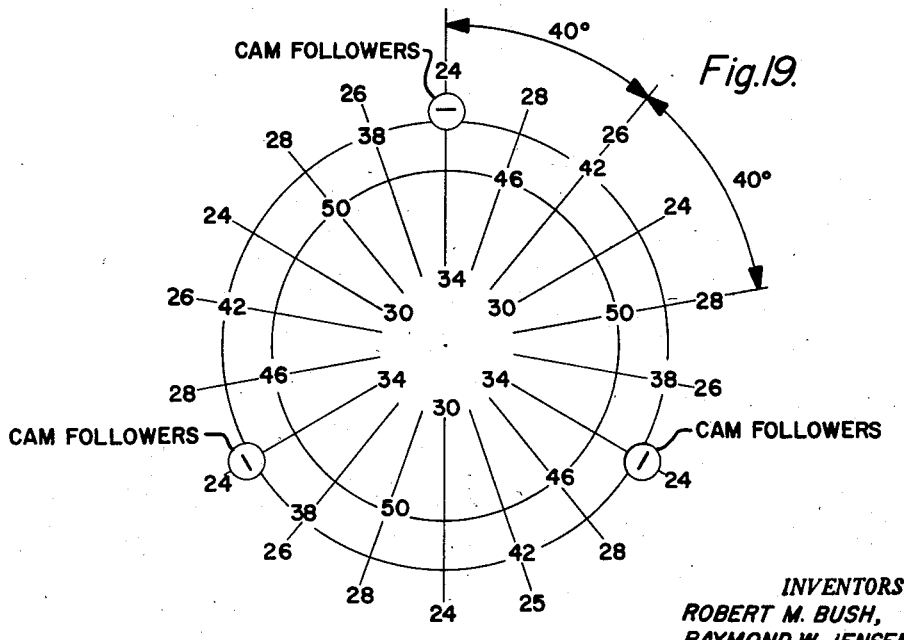

Fig. 18 is a diagram illustrating the phase relationship of the pistons in the present motor operating with respect to axially undulated cam lobes on the pistons and to piston chambers which are alternately filled with pressure fluid and emptied during each revolution of the motor shaft; and Fig. 19 is also a diagram showing the cycle phase and angular relationship of the pistons and their actuating cams, and showing a division of one revolution of the motor pistons and shaft into eighteen equal power strokes which correspond with the dispositions of lobes on the cams.

The present fluid motor is particularly designed to be operated by pneumatic pressure fluid which may be bled from an aircraft engine compressor or taken from any other suitable source. This motor is constructed of materials which make the motor capable of operating under high temperature conditions without lubrication of the bearing surfaces thereof.

The motor is particularly adapted for operation under the foregoing conditions, since it is a low-speed, high-torque motor capable of delivering eighteen power impulses with each revolution of its shaft. While the motor delivers such a great number of independent power impulses for each revolution of the shaft, the duration of these impulses overlap, causing the motor to develop a substantially constant torque and, therefore, it does not require reduction gearing or a flywheel. The motor is a positive displacement motor and develops its highest torque at a stall condition, or when the shaft is in a static position; consequently, it is capable of directly driving a jackscrew which is located internally of the hollow motor shaft. In order to provide sufficient diameter of the shaft to contain the jackscrew, the motor pistons, which are axially slidable on the shaft, have cam tracks formed in the sidewalls thereof; and rotary valves of the motor are carried by the shaft and operate directly in the same bore in which the pistons reciprocate.

All of the operating parts of the motor are concentric with the shaft in which the jackscrew is located, and this permits the over-all size of the motor to be quite small in proportion to its power output. Accordingly, this motor finds utility in confined places such as those in aircraft adjacent to jet engine exit nozzles. The motor is designed so that both ends of its hollow shaft are open, thereby permitting a long jackscrew to be projected therethrough in order to obtain long stroke operation of the jackscrew for activating various mechanisms such as jet engine exit nozzles or thrust reversing devices.

The motor has various applications as a linear actuating device, which may be equivalent to conventional electric motor actuators, but since the present fluid motor will operate at high temperatures without lubrication, it will function under environmental conditions in which conventional electrical and hydraulic actuators may fail.

Referring now to the drawings, and more particularly to Fig. 5 thereof, it will be seen that the fluid motor of the present invention is provided with a housing 18, having an outer wall 19 and an inner wall 20 forming a longitudinal bore 21 in the body. Between the walls 19 and 20, inlet and exhaust passages are formed, these passages communicating with ports in the wall 20. The ports in wall 20 are disposed in registration with the edges of rotary valve disks which are located between pistons received for reciprocation in the bore 21. A shaft 22 is rotatably mounted centrally of the bore 21, all of which will be hereinafter described in detail.

Reciprocably mounted in the bore 21 are pistons 24, 26 and 28. These pistons are concentrically mounted on the shaft 22 and are connected thereto by ball-bearing spline mechanisms which permit the pistons to slide axially of the shaft while causing it to revolve as the pistons are rotated in the bore 21 by action of axially undulated cams.

The side walls of pistons 24, 26 and 28 are provided with recessed cam tracks 25, 27 and 29, respectively.

Projecting into these tracks are cam following rollers 31, 33 and 35, respectively. The piston 24, in its cam track 25, is provided with axially undulated surfaces, including three cam lobes 34 which are spaced 120 degrees apart about the axis of the shaft 22. The track 25 is also provided with an axially undulated cam surface, including three cam lobes 30 which are spaced 120 degrees apart about the axis of the shaft 22. The lobes 30, however, are spaced 60 degrees from the lobes 34. It will be seen from Fig. 3 of the drawings that there are three cam followers 33 which operate in the track 27 of the piston 26, and likewise, there are three cam followers 31 and 35 operating in the tracks 25 and 29 of the pistons 24 and 28, respectively. The cam followers 31, 33 and 35 are arranged in three rows aligned axially parallel to the shaft 22. The individual cam follower rollers 31, of which there are three, are spaced 120 degrees about the axis of the shaft 22 and project into the internal track 25 so that these rollers, while engaging the extremities of the cam lobes 34, are positioned between the cam lobes 30, and when the rollers 31 are engaged by the cam lobes 30, they are disposed between cam lobes 34. This same arrangement exists with respect to opposed cam lobes 38 and 42 with which the cam follower rollers 33 cooperate. A like arrangement exists in the track 29 of the piston 28, wherein opposed cam lobes 46 and 50 are traversed by the cam follower rollers 35.

As shown in Fig. 5 of the drawings, the cam lobes of the pistons 24, 26 and 28 are 40 degrees out of phase with each other, but are substantially identical in structural features. These pistons are maintained 40 degrees out of phase with each other by their spline connection with the shaft 22, which has nine spline grooves 37 spaced 40 degrees apart.

Figure 12:
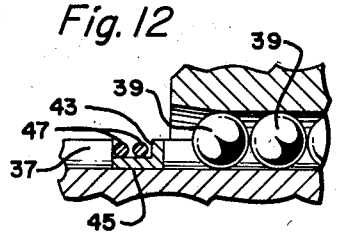
Fig. 12 is a fragmentary longitudinal sectional view of a ball spline mechanism, of the present motor, which interengages pistons and the shaft of the motor so that the pistons drive the shaft but are free to reciprocate thereon.

As shown in Fig. 12 of the drawings, a plurality of spline balls 39 roll in each of the grooves 37 and engage corresponding grooves in the pistons 24, 26 and 28. As shown in Fig. 3, the piston 26 is provided with grooves 41 in which the spline balls 39 are engaged. In each of the grooves 37 and 41 a row of spline balls 39 is maintained captive by split rings 43 in grooves 45 in the periphery of the shaft 22. These split rings 43 are supported on the shaft 22 and maintained in the grooves 45 by coil springs 47 wrapped around the split rings 43. The split rings 43 are spaced axially of the shaft 22 a sufficient distance so that each row of spline balls 39 has some axial play which permits these balls to roll between the split rings 43 in the grooves 37 and 41 when the pistons reciprocate axially of the shaft 22.

The pistons are forced to reciprocate axially of the shaft 22 by pressure fluid admitted to and exhausted from chambers at opposite ends of the pistons. Pressure fluid thus tending to reciprocate the pistons, causes them to rotate due to engagement of the inclined cam surfaces, in the internal tracks of the pistons, with the cam followers which are maintained in stationary position in the housing 18.

As shown in Figs. 2 and 5 of the drawings, the cam follower rollers 31 are supported on needle bearings 54 carried by trunnion members 56 secured to the housing by bolts 58. The needle bearings 54 are maintained axially of the trunnion 56 by a head 60 held in fixed position on the trunnion by a bolt 62. The cam follower rollers 33 and 35 are similarly constructed and supported on bolts 62.

Adjacent one end of the piston 24 is a pressure fluid chamber 32 communicating with a rotary valve disk 64, which conducts pressure fluid into the chamber 32 and also exhausts pressure fluid therefrom. The valve disk 64 is carried by the shaft 22, and the periphery 66 of this valve has a running fit and rotates directly in the bore 21. As shown in Fig. 6 of the drawings, the valve disk 64 is provided with a bore having inwardly directed arcuate projections 68 which extend into the grooves 37 of the shaft 22 and fix the valve for rotation with the shaft.

A chamber 36 at the opposite end of the piston 24 communicates with a rotary valve disk 72 carried by the shaft 22 in a similar manner to the valve 64. This rotary valve 72 runs in the bore 21 and is constructed similarly to the valve 64, except for its flow passages, which will be hereinafter described in detail. The rotary valve 72 is a double-acting valve arranged to conduct pressure fluid into and from a chamber 36 at its one end and a chamber 40 at its opposite end.

The chamber 40 is disposed adjacent to one end of the piston 26, and the opposite end of the piston 26 communicates with the chamber 44. The chamber 44 is adjacent to a rotary valve disk 74, which is similar in construction to the valve 72. At the opposite side of the valve 74, from the chamber 44, is a chamber 48 which is adjacent to one end of the piston 28, and this piston, at its opposite end, communicates with a chamber 52. Pressure fluid is conducted into and from the chamber 52 by another rotary valve disk 76. It will be seen that the rotary valves 64, 72, 74 and 76 are all carried by the shaft 22 and have peripheral portions which engage the wall of bore 21, wherein the pistons reciprocate.

The shaft 22 is provided with a peripheral groove 78, having a snap ring 80 therein which engages one side of the rotary valve 64. The opposite side of the rotary valve 64 is abutted to the inner race of a ball bearing 82, which is adjacent to the inner race of a ball bearing 84 abutted to a snap ring 85 engaging a groove 87 in the periphery of the shaft 22. The outer race of the ball bearing 84 is engaged by a snap ring 86 retained in an annular groove 83 in the end of the bore 21 of the housing 18. A retainer 89, adjacent the outer race of bearing 82, is held in the bore 21 by a snap ring 91, which is fitted in a groove 93. The retainer 89 is disposed in opposition to the snap ring 86 in order to maintain locations of the bearings 82 and 84 axially of the bore 21 of the housing 18. It will be noted that the shaft 22 is axially fixed in the bearings 82 and 84 by abutment of the rotary valve 64 and bearings 82 and 84 between the snap rings 80 and 85. Thus, the rotary valve 64 is retained axially of the shaft 22, and it is fixed axially of the motor housing.

The rotary valve 72 is engaged at its opposite sides by snap rings 90 and 92 fitted in grooves 94 and 96 in the periphery of the shaft 22. Engaging opposite sides of the rotary valve 74 are snap rings 98 and 100 engaged in grooves 102 and 104 in the periphery of the shaft 22. As shown in Figs. 2 and 4 of the drawings, the rotary valve 76 is retained axially on the shaft 22 by snap rings 106 and 108 in grooves 110 and 112 in the periphery of the shaft 22.

As shown in Fig. 4 of the drawings, needle bearings 114 surround a bearing portion 116 on the shaft 22, and these needle bearings 114 run in a bore 118 in a cap 120 of the housing 18. The opposite end of the shaft 22 is supported by the bearings 82 and 84 having their peripheral portions disposed in the end of the bore 21, as hereinbefore described.

The shaft 22 is a hollow shaft, having a bore 122 wherein a jackscrew 124 is mounted. The jackscrew 124 is provided with helical threads 126, having a semi-circular groove adapted to engage ball bearings held by a conventional ball-bearing recirculating nut 128, which is integral with or otherwise fixed to the end of the shaft 22. One end of the jackscrew 124 may be fixed to a mechanism or element to be actuated, while relative rotation of the shaft 22 in its ball-bearing screw-threaded relationship with the jackscrew 124 will project the jackscrew axially of the shaft 22.

It will be noted that the end of the shaft 22, which carries the ball recirculating nut 128, is open, permitting the projection of the jackscrew 124 therefrom. The opposite end 129 of the shaft 22, as shown in Fig. 4, is also open, and the jackscrew 124 projects from this open end of the shaft through a seal 130. This seal 130 is disposed to prevent the entrance of abrasive material into the needle bearings 114. Similar seals may be provided adjacent to the ball bearing 84 and the ball recirculating nut 128 if desired.

Since opposite ends of the shaft 22 are open, the use of a long jackscrew is permitted. Furthermore, it will be appreciated that the containment of the jackscrew internally of the motor shaft provides a very compact structural arrangement of the pneumatic motor for use as a linear actuating mechanism.

Figure 10:
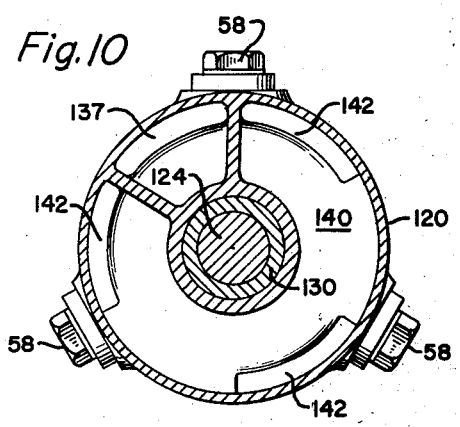
Fig. 10 is a transverse sectional view of the motor taken on the plane indicated by the line 10—10 of Fig. 4 and showing structure of the inlet and exhaust passage means thereof.
Figure 11:
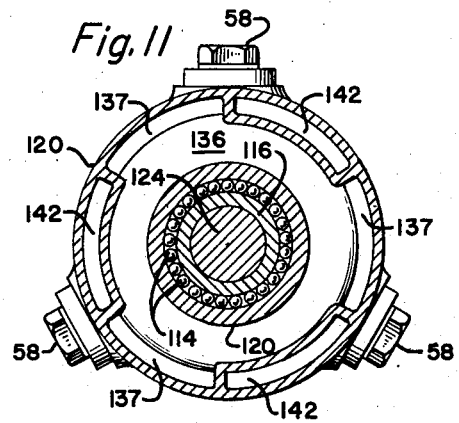
Fig. 11 is a transverse sectional view of the motor taken on the plane indicated by the line 11—11 of Fig. 4 and showing further structure of the inlet and exhaust passage means of the motor.

At one end of the motor, as shown in Fig. 4 of the drawings, conduits 132 and 134 are disposed laterally on opposite sides of the jackscrew 124. These conduits 132 and 134 may be connected to a switching valve, not shown, which is capable of directing pressure fluid into either one of these conduits and permitting exhaust fluid to be conducted from either one of the conduits. The conduits 132 and 134 are hollow cylindrical extensions of the housing cap 120, and each conduit communicates with three longitudinal passages located between the walls 19 and 20 of the motor housing 18. As shown in Figs. 4, 10 and 11, the conduit 132 communicates with a plenum 136 from which three passages 137 extend longitudinally of the motor housing between walls 19 and 20. These passages 137 are disposed 120 degrees apart.

The conduit 134 also communicates with a plenum 140 which communicates with three passages 142 also extending longitudinally between the walls 19 and 20 of the motor housing 18. The passages 142 are disposed 120 degrees apart and are located between the passages 138, as shown best in Fig. 11 of the drawings.

As shown in Figs. 3, 6, 7, 8 and 9 of the drawings, partitions extend longitudinally between the walls 19 and 20 of the motor housing 18, in order to separate the passages 137 and 142, thereby providing six individual flow passages. Three of these passages may be used for pressure fluid intake, while the remaining three passages may be used to conduct exhaust fluid from the motor, as will be hereinafter described in detail.

As shown in Fig. 5 of the drawings, the inner wall 20 of the motor housing 18 is provided with ports 144, 146, 148 and 150 in registration with the edges of rotary valve disks 64, 72, 74 and 76, respectively. These ports open into the passages 137, and may be utilized as pressure fluid inlet ports or exhaust ports in accordance with the rotational direction of the shaft 22, as will be hereinafter described. The inner wall 20 of the motor housing 18 is also provided with ports 152, 154, 156 and 158, which register with the rotary valves 64, 72, 74 and 76, respectively. The ports 152, 154, 156 and 158 communicate with the passages 142, and may serve as pressure fluid intake ports or as fluid exhaust ports for the engine, also depending upon the rotational direction of its shaft 22. As hereinbefore described, the rotational direction of the shaft 22 may be optional, depending upon a valve, not shown, which is connected to the conduits 132 and 134, whereby the directional flow through these conduits may be reversed.

As shown by dotted lines in Fig. 6 of the drawings, the valve disk 64 is provided with three L-shaped recesses 160 which are disposed 120 degrees apart and open to the periphery of the rotary valve disk 64 to alternately communicate, through ports 144 and 152, with passages 137 and 142, respectively, when the valve disk is rotated. The recesses 160 also open to one side of the valve disk and communicate at all times with the chamber 32 at one end of piston 24.

As shown in Fig. 6, the lengths of the recesses 160 opening to the periphery of the rotary valve 64 are such that the recesses will be closed when moving between the ports 144 and 152. Assuming that the shaft of the motor, together with the rotary valves and pistons, rotates in a direction as indicated by arrows A, the passages 137 function as pressure fluid inlets, while the passages 142 serve as exhaust passages.

From Figs. 4, 5 and 6 of the drawings, it will be seen that when the shaft, pistons and valve disks rotate slightly beyond the position in which they are shown in Fig. 6, the recesses 160 communicate with the inlet passages 137, wereupon pressure fluid is permitted to flow into the chamber 32. Pressure fluid in the chamber 32 then acts to force the piston 24 away from the rotary valve 64, whereupon the inclined surfaces of the lobes 34 react against the followers 31, causing the piston 24 to rotate and drive the shaft 22. As the shaft 22 continues to rotate, it carries the recesses 160 of the rotary valve 64 into communication with the openings 152, which permits fluid to be exhausted from the chamber 32 through the recesses 160 and 142 when pressure fluid in the chamber 36 forces the piston 24 toward the chamber 32.

It will be seen that the length of portions 164 of the housing wall 20 between the openings 144 and 152 is substantially equal to the length of the recesses 160 exposed to the periphery of the rotary valve 64. These portions 164 are integral with partitions 166 disposed between the passages 137 and 142.

As shown in Fig. 7 of the drawings, the rotary valve 72 is provided with recesses 168 which communicate with the chamber 36, at one end of the piston 24, and may alternately communicate with intake and exhaust ports 146 and 154, respectively. There are three recesses 168 which are disposed 120 degrees from each other, and these recesses alternately serve as intake and exhaust passages for the chamber 36. The rotary valve 72 is also provided with three recesses 170 which are disposed 120 degrees apart and open to the opposite side of the valve from the recesses 168. The recesses 170 are also disposed to alternately communicate with the ports 146 and 154 and respective inlet and exhaust passages 137 and 142. The rotary valve 72 thus conducts inlet and exhaust fluid to and from both of the chambers 36 and 40 at opposite sides thereof.

The rotary valve 74 is similar in construction to the rotary valve 72 and is provided with fluid-conducting recesses 172 and 174 opening to opposite sides thereof, which conduct intake and exhaust fluids to and from the chambers 44 and 48, respectively.

The rotary valve 76 is similar to the rotary valve 64, since it has only three fluid-conducting recesses 176 opening to one side. These passages communicate with the chamber 52 for conducting intake and exhaust fluids thereto and therefrom.

The construction of the valves 72 and 74 is similar, since they are double-acting valves, each having three recesses on each side which alternately function as intake and exhaust passages.

As shown in Fig. 7, the peripheral openings of the passages 168 and 170 in the rotary valve 72 are disposed adjacent to each other in order to provide a proper phase relationship of the valve passages in the rotary valve 72, relative to the passages in the remaining rotary valves. Peripheral openings of the passages 172 and 174 in the rotary valve 74 are likewise disposed adjacent to each other, as shown in Fig. 8 of the drawings. In the construction of the valves 72 and 74, the adjacent peripheral openings of the intake and exhaust passages extend about the peripheries of the valve disks a combined distance substantially equal to the length of the inlet and outlet ports 146, 148, 154 and 156 in the housing; thin partitions are disposed between the adjacent ends of the peripheral openings in these valves. A generally L-shaped configuration, when the valve disks are viewed from the ends, is given to the inlet and exhaust recesses to permit sufficient fluid flow between the chambers at opposite ends of the pistons and the respective inlet and exhaust passages 137 and 142.

It will be noted that each piston is provided with two opposed cam surfaces, each surface having three cam lobes spaced 120 degrees about the axis of the motor shaft. The lobes of one cam surface on each piston are disposed equidistantly between or 60 degrees from the lobes of the other cam surface on such piston. It will also be noted that the pistons are so positioned on the shaft 22 that a cam lobe is located every 20 degrees about the axis of rotation of the shaft. The inlet and the exhaust fluid-conducting passages of the rotary valves 64, 72, 74 and 76 are phased with respect to each other and with respect to the cams of the pistons, so that the motive fluid is conducted into and out of the chambers 32, 36, 40, 44, 48 and 52 in proper sequence, to effect a substantially continuous application of torque to the shaft. The pistons are reciprocated axially of the shaft 22 by pressure fluid, the ingress and egress of which is timed by the rotary valves in properly phased relationship with the cam lobes and cam followers, so that each piston delivers six power strokes during each revolution of the shaft. Since there are three pistons, eighteen power impulses are imparted to the shaft 22 during each revolution thereof.

As shown in Figs. 18 and 19, these power strokes are phased 20 degrees apart and are of such duration that they overlap; consequently, power is delivered to the shaft 22 at a substantially constant torque at any phase of a revolution of the shaft.

Fig. 18 discloses the order in which the piston chambers are energized with pressure fluid, relative to the cam lobes of the pistons which are engaged with the cam followers during the operation of the respective pistons.

Fig. 18 is a diagrammatic view showing the operations of pistons 24, 26 and 28 during one cycle of the motor shaft 22, the particular cycle selected for illustration starting with the introduction of fluid pressure into chamber 32 at one end of piston 24. In Fig. 18, sinusoidal curves are employed to represent the reciprocations of the pistons, and areas above and below the base lines of the curves represent the chambers at opposite ends of the pistons. These areas are identified by the same reference numerals as the chambers they represent. Portions of such areas are shaded by diagonal lines to indicate the degrees of revolution of the shaft during which the chambers are pressurized with operating fluid. The cam lobes cooperating with the cam followers to effect the rotation of the shaft, during the pressurization of the respective chambers are indicated by the same reference numerals as the cam lobes identified thereby in the other figures.

From Fig. 18 it will be seen that each chamber is pressurized during 60 degrees of revolution of the shaft, that the chambers at opposite ends of the pistons are alternately pressurized, and that the periods of pressurization of the cylinders of the different pistons are so timed that they overlap, as previously pointed out.

At the lower portion of Fig. 18, the sinusoidal curves are superimposed on one another to show that forces causing the rotation of the shaft 22 are continuously applied.

Fig. 19 discloses the manner in which the six power strokes of each of the three pistons are phased, relative to each other, in order to cause a power impulse to be delivered to the shaft 22 during each 20 degrees of each revolution thereof.

Fig. 19 discloses the distribution of the lobes of the cams about the axis of rotation of the shaft and the relative order of engagement thereof with the cam followers. In this figure the reference numerals of the pistons are disposed in the outer circle, while the reference numerals of the cam lobes are placed on radiating lines extending to the respective piston numerals. These radiating lines indicate the angular distance between the cam lobes.

The operation of the fluid motor in accordance with the present invention is substantially as follows:

Any suitable valve not shown in the drawings may be utilized to control the flow of motive fluid into and from the intake and outlet conduit portions 132 and 134 shown in Fig. 4 of the drawings. For purposes of illustration, the conduit 132 is the inlet to the motor, and the conduit 134 is the exhaust passage therefor. It will be understood that rotary operation of the motor may be reversed by admitting pressure fluid into the conduit 134 and permitting the conduit 132 to function as the exhaust for the motor.

As hereinbefore described, motive fluid entering the conduit 132 flows inwardly through the passages 137 and rotary valves 64, 72, 74 and 76. The ports in these valves communicate with the inlet and exhaust passages 137 and 142 in timed sequence. The valves conduct motive fluid to and from chambers at opposite ends of the pistons 24, 26 and 28 in properly timed relationship, so that the pistons tend to move axially, whereupon the cam lobes in the cam tracks 25, 27 and 29 engage the cam followers 31, 33 and 35 and cause the rotation of the pistons. The motor shaft 22 is thus forced to rotate the ball recirculating nut 128, which either projects or retracts the jackscrew 124 axially of the motor according to the operating direction of its shaft.

As hereinbefore described, opposite ends of the hollow shaft 22 are open to permit a jackscrew of desired length to pass axially through the entire motor. This arrangement provides a very compact linear actuator structure.

Shown in Figs. 13-17, inclusive, is one form of control mechanism for the present pneumatic motor; such mechanism includes throttle valve means operable by the motor to limit flow of motive fluid therethrough when the jackscrew, actuated by the motor shaft, reaches predetermined extended or retracted positions. This control mechanism involves slight modifications of the motor structure with respect to that shown in Figs. 1–12, inclusive.

Figure 13:
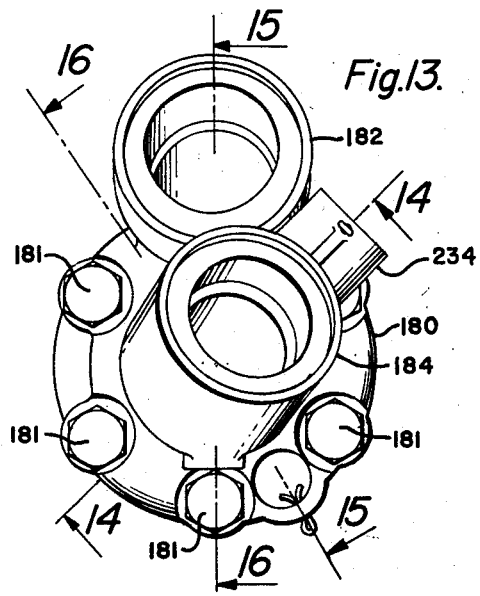
Fig. 13 is an end view of a fluid motor formed in accordance with the present invention and provided with a novel control mechanism.

As shown in Fig. 13 of the drawings, the control mechanism of the invention includes a throttle valve housing 180, which is secured by bolts 181 to the end of the motor housing 18 in place of the housing cap 120 shown in Fig. 4 of the drawings. The throttle valve housing 180 is provided with conduit portions 182 and 184, which may selectively serve as fluid inlet and exhaust passages for the motor of the present invention. It will be understood that the conduits 182 and 184 may be used either as inlet or exhaust passages, depending upon a fluid control valve, not shown, which may alternately cause pressure fluid to flow into these passages or exhaust fluid to flow therefrom.

Figure 15:
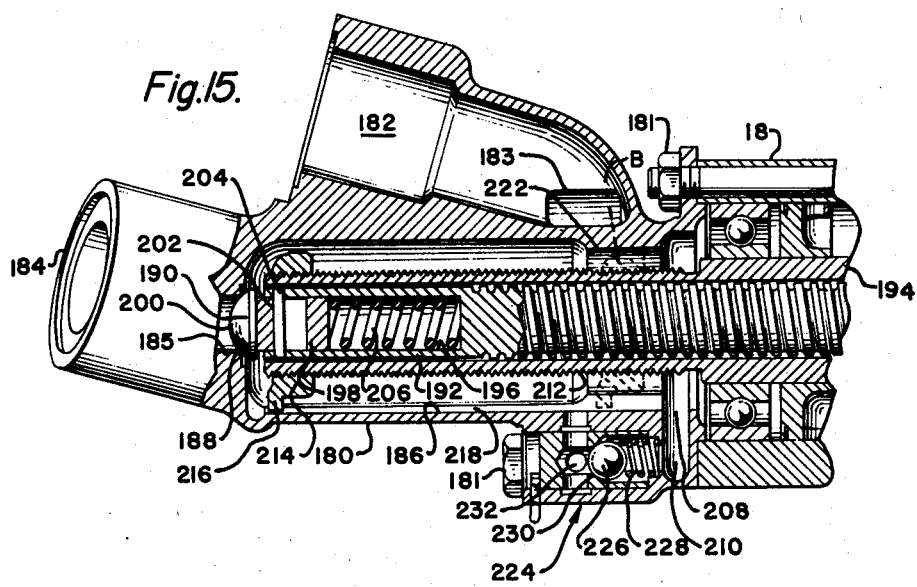
Fig. 15 is a fragmentary sectional view taken on planes indicated by the line 15—15 of Fig. 13.

The conduit 184 communicates with an enlarged bore portion 186 in the housing 180, and a valve seat 188 is disposed at a transition between a bore 185 of the conduit 184 and the enlarged bore 186. This valve seat 188 is engageable by a throttle valve member 190, which is carried by a jackscrew 192 extending through the motor shaft 194. The jackscrew 192 and the hollow motor shaft 194 shown in Fig. 15 are similar to the jackscrew 124 and the hollow motor shaft 22, respectively, shown in Fig. 2 of the drawings. The jackscrew 192 is provided with a bore 196 in which the cylindrical shank 198 of the throttling valve 190 is positioned. The valve member 190 is provided with a poppet head 200 for engagement with the valve seat 188, and the shank 198 is provided with a transverse slot 202 through which a pin 204 extends. Opposite ends of the pin are fixed in the jackscrew 192, in order to retain the valve member 190 in the bore 196, wherein a spring 206 is held in engagement with the shank 198 of the valve member 190 and tends to force the valve toward the seat 188.

The valve member 190 is thus spring-loaded axially of the jackscrew 192, permitting slight overtravel of the latter after the poppet head of the valve member 190 has engaged the seat 188. Thus the valve member 190 is disposed to limit flow through the conduit 184 when the jackscrew 192 reaches a predetermined retracted position, as shown in Fig. 15 of the drawings. The enlarged bore portion 186, which communicates with the conduit 184, is disposed to conduct fluid to a plenum 208.

Figure 17:
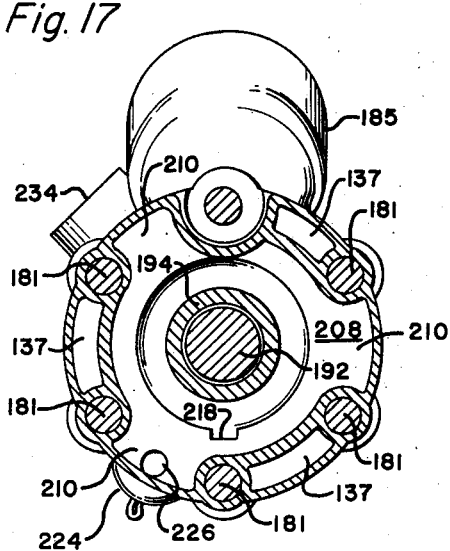
Fig. 17 is a transverse sectional view taken on the plane indicated by the line 17—17 of Fig. 16.
Figure 16:
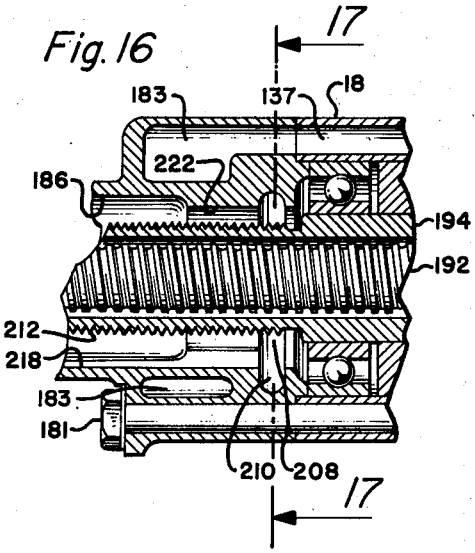
Fig. 16 is a fragmentary sectional view taken on planes indicated by the line 16—16 of Fig. 13.

The plenum 208, as shown in Figs. 15 and 17 of the drawings, surrounds the motor shaft 194 and is provided with radially disposed branches 210 which are spaced 120 degrees apart and communicate with passages 142 in the housing 18 of the motor, hereinbefore described in connection with the motor disclosed in Figs. 1–12, inclusive, of the drawings.

The motor shaft 194 is provided with external screw threads 212 which are engaged by internal threads of a throttle valve member 214. The valve member 214 is generally circular and provided with a projecting key 216 which traverses a slot 218 in the side wall of the bore 186. The key 216 in the slot 218 prevents the valve member 214 from rotating while the motor shaft 194 is rotatable relative thereto, whereby the valve member 214 may be moved axially of the shaft 194 when the shaft rotates. The valve member 214 is movable into a throttling valve bore portion 222 of the bore 186, as shown by broken lines B in Fig. 15 of the drawings.

The valve member 214, when in the bore portion 222, throttles flow through the bore 186 and plenum 208, and when in this position, the jackscrew 192 is in a predetermined extended position. It will be noted that the screw threads 212 on the shaft 194 have a considerably finer pitch than the relatively coarse threads 193 of the shaft 194, whereby the jackscrew may be axially extended a considerable distance while the valve element 214 traverses the shaft 194 from the solid line position to the broken line position shown in Fig. 15. When the jackscrew is initially moved from the retracted position shown in Fig. 15 toward the extended position, the valve 200 will be moved away from the seat 188.

In order to actuate the jackscrew 192 to a predetermined extended position, it is necessary to supply the conduit 182 with pressure fluid which passes inwardly therethrough and into a plenum 183, which communicates directly with passages 137 in the motor housing 18.

When pressure fluid passing into the conduit 182 has fully extended the jackscrew 192, the valve member 214 throttles exhaust flow through the plenum 208 and the bore 222. It is then necessary to reverse flow through the motor and conduct pressure fluid into conduit 184 while permitting the conduit 182 to conduct exhaust fluid from the motor, in order to retract the jackscrew 192.

When pressure fluid is admitted to the conduit 184, with the jackscrew 192 in the fully extended position and the valve member 214 disposed in throttling position in the bore 222, pressure fluid admitted to the bore 186 via the conduit 184 is prevented from flowing into the plenum 208 and passages 142 of the motor. In order to permit pressure fluid to initially flow into the plenum 208, a bypass valve 224 is provided. This valve operates to admit pressure fluid to flow from the bore 186 around the closed valve member 214 and into the plenum 208. The bypass valve 224 is consturcted so that it permits sufficient flow into the motor, whereby the jackscrew 192 and motor shaft 194 are rotated until the valve member 214 is retracted from the bore 222, which then permits pressure fluid to flow from the bore 186 directly to the plenum 208.

The specific construction of the bypass valve 224 includes a conventional spherical valve element 226 engaged by a spring 228, which tends to hold the valve element 226 on a valve seat 230 communicating with a passage 232 which is connected directly with the bore 186. The seat 230 also communicates with the plenum 208, whereby pressure fluid in the bore 186 may force the spherical valve member 226 off the seat 230 and permit flow through the passage 232 and into the plenum 208.

Another bypass valve 234 communicates with the bore 186 in order to permit exhaust fluid to bypass the valve member 190 when it engages the seat 188 corresponding to a fully retracted position of the jackscrew 192. Pressure fluid flowing into the conduit 184 causes the pneumatic motor to rotate in a direction to retract the jackscrew 192 until the valve member 190 shuts off flow through the conduit 184 by engaging the seat 188.

As hereinbefore described, it is then necessary to admit pressure fluid to the conduit 182 in order to extend the jackscrew 192 and to remove the valve member 190 from the seat 188. However, while the valve member 190 is seated, fluid exhausted from the motor must pass out through the bore 186 and bypass valve 234. Such bypass flow must continue until the valve member 190 is unseated, so that the exhaust fluid may pass outwardly through the conduit 184.

Figure 14:
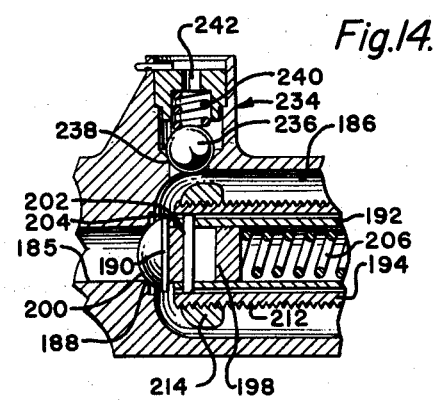
Fig. 14 is a fragmentary sectional view taken through the control mechanism on the plane indicated by the line 14—14 of Fig. 13.

As shown in Fig. 14, the bypass valve 234 includes a spherical valve element 236 which is loaded against a valve seat 238 by a spring 240. The seat 238 communicates with the bore 186 and with atmosphere via a vent opening 242.

As hereinbefore described, the valve members 190 and 214 are actuated by the jackscrew 192 and motor shaft 194, respectively, and these valve members are operable to limit fluid flow through the bore 186 when the jackscrew 192 reaches its extreme extended and retracted positions. The bypass valves 224 and 234 serve to permit pressure fluid and exhaust fluid, respectively, to flow through the bore 186 when the valve members 214 and 190 are in their respective closed positions.

Pressure fluid admitted to the conduit 182 causes the present motor to rotate in a direction which extends the jackscrew 192 and moves it away from the conduit 184 while it conducts exhaust fluid from the motor. Pressure fluid admitted to the conduit 184 causes the motor to rotate in a direction which effects retraction of the jackscrew 192. During this action of the motor, the conduit 182 conducts exhaust fluid from the motor. As hereinbefore described, it will be obvious that neither of the valve members 190 or 214 may be opened without first reversing flow through the conduits 182 and 184.

When the jackscrew 192 is in fully extended position, it may be necessary to maintain some pressure fluid in the pneumatic motor tending to hold the jackscrew 192 in opposition to a load which may be imposed axially thereon. In order to accomplish this function, the throttling valve 214 may be provided with slight clearance in the throttle valve bore 222, so that sufficient flow may pass through this throttle valve 214 in order to match leakage through the motor and thereby maintain a sufficient fluid pressure and torque which will act on the pistons 24, 26 and 28. Thus an axial load on the jackscrew 192 may be maintained.

The pneumatic motor of the present invention is particularly adapted for use in actuating various accessories on an aircraft. Due to its ability to operate under high temperature conditions, the motor may be used adjacent the exit nozzle of an aircraft jet engine for operating nozzle or thrust reverser actuating mechanisms of such engines. This motor may be situated with its axis parallel to that of an aircraft jet engine, and the housing of the motor may be located adjacent the outer housing of the jet engine where ambient temperatures are quite high.

Since the motor is capable of delivering its highest torque when in a stall condition, it is able to project or retract the jackscrew 124 at any operating speed, providing pressure of motive fluid admitted to the intake of the motor is sufficient to operate it under a given load.

It will be obvious to those skilled in the art that various modifications of the present invention may be resorted to in a manner limited only by a just interpretation of the following claims.

We claim:

1. In a fluid operated motor the combination of: a housing having a bore therein; a hollow shaft rotatably mounted in said housing concentric with said bore; a jackscrew internally of said hollow shaft; a nut operable by said shaft and screw-threadedly connected to said jackscrew to shift it axially of said shaft; piston means mounted concentrically on said shaft and movable in said bore; rotary valve means carried by said shaft and disposed to apply fluid pressure from an external source to said piston means and direct used fluid to exhaust; spline means interconnecting said shaft and said piston means whereby fluid pressure may force said piston means to slide axially of said shaft while said piston means is coupled for rotation with said shaft; axially undulated cam means concentric with said shaft; and follower means engaging said cam means and operable to cause rotation of said piston means and shaft when motive fluid forces said piston means axially of said shaft, said valve means being timed and said cam and follower means being disposed to cause said piston means to transmit continuous torque to said shaft.

2. In a fluid operated motor the combination of: a housing having a bore therein; a hollow shaft open at both ends and rotatably mounted in said housing concentric with said bore; a jackscrew internally of said hollow shaft and extensible outwardly from either open end of said shaft; a nut operable by said shaft and screw-threadedly connected to said jackscrew to actuate it axially of said shaft; piston means mounted concentrically on said shaft and movable in said bore; rotary valve means carried by said shaft and disposed to apply fluid pressure from an external source to said piston means and direct used fluid to exhaust; spline means interconnecting said shaft and said piston means whereby fluid pressure may force said piston means to slide axially of said shaft while said piston means is coupled for rotation with said shaft; axially undulated cam means concentric with said shaft; and follower means engaging said cam means and operable to cause rotation of said piston means and shaft when motive fluid forces said piston means axially of said shaft, said valve means being timed and said cam and follower means being disposed to cause said piston means to transmit continuous torque to said shaft.

3. In a pneumatic motor the combination of: a housing having a cylinder bore; a plurality of pistons reciprocally mounted in said bore, said pistons having axially undulated cam tracks recessed in their peripheral portions; cam followers supported in said housing and projecting into said tracks; a shaft extending concentrically through said pistons; spline means connecting said pistons and said shaft, and permitting said pistons to slide axially on said shaft; a rotary valve secured to said shaft adjacent each end of each piston, each valve being provided at its periphery with a plurality of inlet and exhaust flow passages and having a running fit in said bore, at least one of said valves forming a partition in said bore between two of said pistons and having inlet and exhaust passages communicating with each of such pistons, the inlet passages of each valve being angularly spaced about the axis of said shaft and operative to initiate a reciprocatory movement of the respective piston at a plurality of predetermined stages of a cycle of rotation of said shaft; and passage means in said housing exposed to the periphery of each rotary valve and alternately communicating with the inlet and exhaust passages therein upon rotation of said shaft.

4. In a pneumatic motor the combination of: a housing having a cylinder bore; a plurality of pistons reciprocally mounted in said bore; axially undulated cam means operable to rotate said pistons when the latter are moved axially in said bore; a hollow shaft extending concentrically through said pistons; spline means connecting said pistons and said shaft, said spline means permitting said pistons to slide axially on said shaft; a rotary valve secured to said shaft adjacent each end of each piston, each valve being provided at its periphery with flow passages and having a running fit in said bore, at least one of said valves forming a partition in said bore between two of said pistons and having inlet and exhaust passages communicating with each of such pistons, the inlet passages of each valve being angularly spaced about the axis of said shaft and operative to initiate a reciprocatory movement of the respective piston at a plurality of predetermined stages of a cycle of rotation of said shaft; passage means in said housing exposed to the periphery of each rotary valve and alternately communicating with the inlet and exhaust passages therein upon rotation of said shaft; a jackscrew internally of said hollow shaft; and a nut driven by said shaft and engaging said screw to actuate it axially of said shaft.

5. In a pneumatic motor the combination of: a housing having a cylinder bore; a plurality of pistons reciprocally mounted in said bore, said pistons having axially undulated cam tracks recessed in their peripheral portions; cam followers supported in said housing and projecting into said tracks; a hollow shaft extending concentrically through said pistons; spline means connecting said pistons and said shaft and permitting said pistons to slide axially on said shaft; a rotary valve secured to said shaft adjacent each end of each piston, each valve being provided at its periphery with flow passages and having a running fit in said bore, at least one of said valves forming a partition in said bore between two of said pistons and having inlet and exhaust passages communicating with each of such pistons; passage means in said housing exposed to the periphery of each rotary valve and alternately communicating with the inlet and exhaust pasaesges therein upon rotation of said shaft, the inlet passages of each valve being angularly spaced about the axis of said shaft and operative to initiate a reciprocatory movement of the respective piston at a plurality of predetermined stages of a cycle of rotation of said shaft; a jackscrew within said hollow shaft; and a nut driven by said shaft and engaged with said screw to actuate it axially of said shaft.

6. In a fluid operated motor the combination of: a housing having a bore therein; a hollow shaft rotatably mounted in said housing concentric with said bore; piston means mounted concentrically on said shaft and movable in said bore; spline means interconnecting said shaft and said piston means whereby said piston is permitted to slide axially of said shaft and is coupled to rotate therewith; axially undulated cam means substantially concentric with said shaft; follower means engaging said cam means and operable to cause rotation of said piston means and shaft when motive fluid forces said piston means axially of said shaft; rotary valve means carried by said shaft and disposed to alternately apply fluid under pressure to opposite ends of said piston means and direct used fluid to exhaust; means forming fluid passages communicating with said rotary valve means and operable to conduct fluid under pressure from an external source to and used fluid from said motor; a jackscrew within said hollow shaft; and a nut operable by said shaft and screw-threadedly connected to said jackscrew to actuate it axially of said shaft upon rotation of the latter.

7. In a fluid operated motor the combination of: a housing having a bore therein; a hollow shaft rotatably mounted in said housing concentric with said bore; piston means mounted concentrically on said shaft and movable in said bore; spline means interconnecting said shaft and said piston means whereby said piston means is permitted to slide axially of said shaft and is coupled to rotate therewith; axially undulated cam means concentric with said shaft; follower means engaging said cam means and operable to cause rotation of said piston means and shaft when motive fluid forces said piston means axially of said shaft; rotary valve means carried by said shaft and disposed to alternately apply fluid under pressure to opposite ends of said piston means and direct used fluid to exhaust; means forming a motive fluid passage communicating with said rotary valve means and operable to conduct inlet and exhaust fluids to and from said motor; a jackscrew within said hollow shaft; a nut operable by said shaft and screw-threadedly connected to said jackscrew to actuate it axially of said shaft; means forming a second motive fluid passage for establishing communication between a source of fluid pressure and said first-mentioned passage; a throttle valve operable to control fluid flow through said second passage; and means operable by movement of said shaft to close said throttle valve when said jackscrew reaches a predetermined position axially of said shaft.

8. In a fluid operated motor the combination of: a housing having a bore therein; a hollow shaft rotatably mounted in said housing concentric with said bore; a piston mounted concentrically on said shaft and movable in said bore; spline means interconnecting said shaft and said piston, whereby said piston is permitted to slide axially of said shaft and is coupled to rotate therewith; axially undulated cam means concentric with said shaft; follower means engaging said cam means and operable to cause rotation of said piston and shaft when motive fluid forces said piston axially of said shaft; rotary valve means carried by said shaft and disposed to direct motive fluid to and from said piston; means forming motive fluid passages communicating with said rotary valve and operable to conduct inlet and exhaust fluids to and from said motor; a jackscrew within said hollow shaft; a nut operable by said shaft and screw-threadedly connected to said jackscrew to actuate it axially of said shaft; means forming a pair of motive fluid passages communicating with said first-mentioned fluid passages; and a pair of throttle valves, one of said throttle valves being operable by said jackscrew and disposed to close one of said pair of passages when said jackscrew is in a predetermined retracted position, the other of said throttle valves screw-threadedly operable by said shaft and disposed to close one of said pair of passages when said jackscrew reaches a predetermined extended position.

9. In a fluid operated motor the combination of: a housing having a bore therein; a hollow shaft rotatably mounted in said housing concentric with said bore; a piston mounted concentrically on said shaft and movable in said bore; spline means interconnecting said shaft and said piston, whereby the latter is permitted to slide axially of said shaft and is coupled to rotate therewith; axially undulated cam means concentric with said shaft; follower means engaging said cam means and operable to cause rotation of said piston and shaft when motive fluid forces said piston axially of said shaft; rotary valve means carried by said shaft and disposed to direct motive fluid to and from said piston; means forming a pair of motive fluid passages communicating with said rotary valve, each passage of said pair being alternately operable to conduct inlet and exhaust fluids to and from said motor; a jackscrew within said hollow shaft; a nut operable by said shaft and screw-threadedly connected to said jackscrew to actuate it axially of said shaft; means forming a second pair of motive fluid passages communicating with said first-mentioned pair of passages, the passages of said second pair being operative to conduct fluid in forward and reverse directions; a pair of throttle valves, one of said throttle valves being operable by said jackscrew and disposed to close one passage of said second pair of passages when said jackscrew is in a predetermined retracted position, the other of said throttle valves being screw-threadedly operable by said shaft and disposed to close one passage of said second pair of passages when said jackscrew reaches a predetermined extended position; and pressure fluid bypass means for said throttle valves to permit flow of pressure fluid therearound when the flow of pressure fluid through the passage of said second pair of passages is reversed, whereby limited operation of said motor may be effected during a closed condition of one of said throttle valves until it is opened by movement of said shaft to permit normal flow through the said motive fluid passages.

10. In combination with a fluid motor of the type having a housing with a bore, a plurality of piston elements disposed for reciprocation in the bore, reaction means on the housing and piston elements to cause relative rotation thereof upon reciprocation of the piston elements, and valve means at each end of each piston to control the flow of fluid under pressure into and the exhaust of fluid from said bore to effect the reciprocation of said piston elements: a hollow shaft journalled in said housing and fixed for rotation with said piston elements, the latter being movable longitudinally relative to said shaft; a nut member fixed for rotation with said hollow shaft; and a jackscrew extending into said hollow shaft and having a threaded engagement with said nut member.

11. In combination with a fluid motor of the type having a housing with a bore, a plurality of piston elements disposed for reciprocation in the bore, reaction means on the housing and piston elements to cause relative rotation thereof upon reciprocation of the piston elements, and valve means at each end of each piston to control the flow of fluid under pressure into and the exhaust of fluid from said bore to effect the reciprocation of said piston elements: a hollow shaft journalled in said housing and fixed for rotation with said piston elements, the latter being movable longitudinally relative to said shaft; nut means fixed for rotation with said hollow shaft; and jackscrew means extending axially of said hollow shaft, said jackscrew means being in threaded engagement with said nut means, rotary movement of said hollow shaft causing longitudinal movement of said jackscrew.

12. In combination with a fluid motor of the type having a housing with a bore, a plurality of piston elements disposed for reciprocation in the bore, reaction means on the housing and piston elements to cause relative rotation thereof upon reciprocation of the piston elements, and valve means at each end of each piston to control the flow of fluid under pressure into and the exhaust of fluid from said bore to effect the reciprocation of said piston elements: a hollow shaft journalled in said housing and fixed for rotation with said piston elements, the latter being movable longitudinally relative to said shaft; ball-bearing recirculating nut means fixed for rotation with said hollow shaft; and jackscrew means with threads formed to receive the ballbearings of said nut means extending axially through said hollow shaft, rotary movement of said hollow shaft causing longitudinal movement of said jackscrew.

13. In combination with a fluid motor of the type having a housing with a bore, a plurality of piston elements disposed for reciprocation in the bore, reaction means on the housing and piston elements to cause relative rotation thereof upon reciprocation of the piston elements, and valve means at each end of each piston to control the flow of fluid under pressure into and the exhaust of fluid from said bore to effect the reciprocation of said piston elements: a hollow shaft journalled in said housing and fixed for rotation with said piston elements, the latter being movable longitudinally relative to said shaft; nut means fixed for rotation with said hollow shaft; jackscrew means extending axially of said hollow shaft, said jackscrew means being in threaded engagement with said nut means, rotary movement of said hollow shaft causing longitudinal movement of said jackscrew; and valve means operative when said jackscrew reaches a predetermined position during longitudinal movement to interrupt flow of fluid under pressure to said bore.

14. In combination with a fluid motor of the type having a housing, a plurality of axially aligned reciprocable pistons in said housing, valve means in said housing for alternately applying fluid pressure to opposite ends of each piston to cause a plurality of reciprocations thereof during each cycle of operation of the motor, and reaction means on the housing and pistons to cause relative rotation thereof upon reciprocation of the pistons, the valve means and reaction means being relatively disposed to cause the fluid motor to continuously develop torque; a hollow shaft journalled in said housing and fixed for rotation with said piston elements, the latter being movable longitudinally relative to said shaft; a nut member fixed for rotation with said hollow shaft; and a jackscrew extending into said hollow shaft and having a threaded engagement with said nut member, rotation of said hollow shaft and nut member causing axial movement of said jackscrew.

References Cited in the file of this patent

UNITED STATES PATENTS

| | | |
|---|---|---|
| 416,147 | Edgerton | Nov. 26, 1889 |
| 1,197,591 | Bargery | Sept. 12, 1916 |
| 1,629,686 | Dreisbach | May 24, 1927 |
| 2,660,028 | Geyer | Nov. 24, 1953 |
| 2,765,778 | Gerry et al. | Oct. 9, 1956 |

FOREIGN PATENTS

| | | |
|---|---|---|
| 139,349 | Australia | Aug. 28, 1947 |